Figure 1:
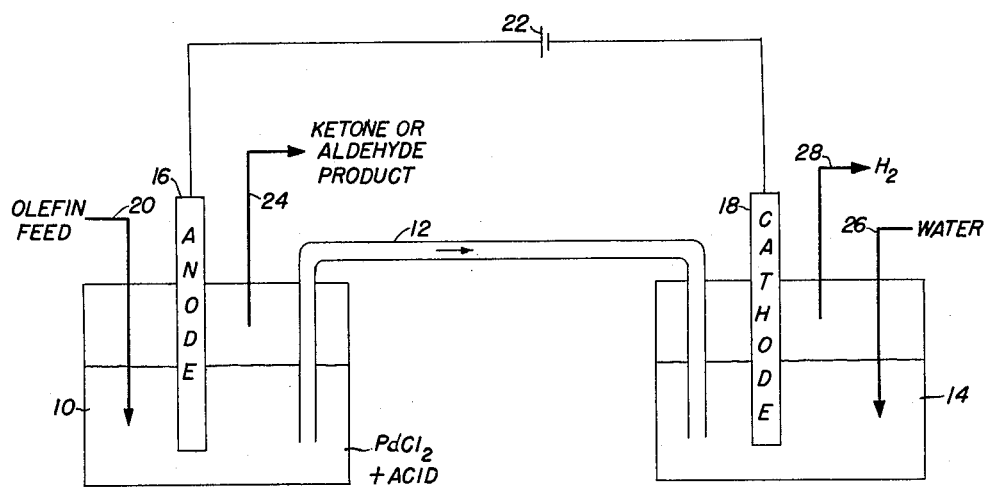

Sept. 1, 1964   D. L. KLASS   3,147,203

PROCESS FOR THE PRODUCTION OF CARBONYL COMPOUNDS

Filed Sept. 21, 1961

CONTINUOUS ELECTROCHEMICAL REGENERATION
OF CATALYST IN OLEFIN OXIDATION PROCESS

CATALYTIC OXIDATION OF OLEFINS TO
ALDEHYDES OR KETONES

INVENTOR.
DONALD L. KLASS

BY

*Edward H. Fang*

ATTORNEY

United States Patent Office 3,147,203
Patented Sept. 1, 1964

3,147,203
PROCESS FOR THE PRODUCTION OF CARBONYL COMPOUNDS
Donald L. Klass, Barrington, Ill., assignor to The Pure Oil Company, Chicago, Ill., a corporation of Ohio
Filed Sept. 21, 1961, Ser. No. 139,694
8 Claims. (Cl. 204—80)

This invention relates to new and useful improvements in processes for the production of carbonyl compounds, e.g., aldehydes and ketones, by oxidation of olefin hydrocarbons. More particularly, this process is concerned with the electrochemical regeneration of a noble-metal catalyst used in the production of aldehydes and ketones by oxidation of olefins. This process is also concerned with the simultaneous production of carbonyl compounds and electrical energy by carrying out the oxidation of an olefin in separate anodic and cathodic reaction zones containing an anode and a cathode connected through an external electric circuit.

The direct chemical conversion of olefins to carbonyl compounds, such as aldehydes and ketones, by direct oxidation has occupied the interest of organic chemists for many years. A procedure which could accomplish this conversion economically with high selectivity would be commercially valuable because aldehydes and ketones are large-volume, "heavy" organics with established markets. Patents and other literature disclose certain one-step methods for preparation of aldehydes and ketones from olefins, but most processes reported in the prior art suffer from poor selectivities and low yields because olefins and the carbonyl products are too reactive. No known process is in commercial use today in the United States for the direct chemical oxidation of olefins to carbonyl compounds.

In March 1959 a publication appeared by the Consortium für Electrochemische Industrie G.m.b.H (J. Smidt, Angew. Chem., 71, No. 5, 176–182, March 7, 1959), Munich, Germany, on a new, continuous process for catalytic oxidation of olefins to carbonyl compounds using a novel catalyst composed of a platinum-group metal salt and a redox system. Shortly before this paper was published, patents began to issue in Germany, Luxembourg, France, South Africa, and Australia on this process. The process is described in Australian patent specification No. 39,115, filed June 27, 1958, and Canadian Patent 618,144. In this process, a mixture of an olefin and oxygen (or air) is contacted with the catalyst solution comprising a solution of platinum-group salt, preferably of a hydrohalic acid, at a temperature in the range from about 0° to 200° C. to pressure of 1 to 50 atmospheres. Under these conditions, the olefin is converted to the carbonyl compound (aldehyde or ketone) in excellent yield. In the course of the oxidation of the olefin to the carbonyl compounds, the platinum-group metal salt is reduced to a lower oxidation state, and in some cases is reduced to the metal. The tendency of the catalyst to be reduced to a lower oxidation state is offset by including in the solution a substantial excess of a water-soluble salt of a multi-valent metal in its highest oxidation state. These salts function as oxidizers to maintain the noble-metal catalyst in the highest oxidation state and thus permit a sustained operation of the process. Since the oxidizer salt is gradually depleted with extensive use of the process, the reactants and products are periodically stripped from the reaction zone, and the solution is blown with air or oxygen to reconvert the platinum-group metal and multivalent salts to their respective highest oxidation states. This process, however, suffers from the disadvantage that if the platinum-group metal salt is reduced to the metal, the multivalent metal salt cannot re-oxidize the noble metal. This necessitates close control on the operation of the process to prevent reduction of the catalyst salt to the noble metal.

It is therefore one object of this invention to provide a new and improved method for the production of carbonyl compounds by oxidation of olefins in the presence of an aqueous solution of a platinum-group metal salt, in which process the catalyst is regenerated by electrochemical oxidation.

Another object of this invention is to provide a novel process for production of carbonyl compounds by oxidation of an olefin hydrocarbon in the presence of an aqueous catalyst solution with simultaneous generation of electrical energy.

A feature of this invention is the provision of a novel process for the production of carbonyl compounds by oxidation of olefin hydrocarbons in the presence of an aqueous catalytic solution of a platinum-group metal salt in which the catalyst is reduced toward a lower oxidation state, and the catalyst is continuously regenerated by electrochemical oxidation.

Another feature of this invention is the provision of a process, carried out in separate anodic and cathodic reaction zones having an anode and cathode connected to a direct-current source, in which an olefin is introduced into the anodic reaction zone in contact with a catalyst solution of a salt of a platinum-group metal, whereby a carbonyl compound is evolved and the catalyst is regenerated in the anodic reaction zone, and hydrogen is evolved at the cathode.

Another feature of this invention is the provision of a process in which an olefin is introduced into an anodic reaction zone containing a catalytic solution of a salt of a platinum-group metal, and an oxygen-containing gas is introduced into a cathodic reaction zone, whereby the olefin is oxidized to a carbonyl compound, the catalyst is continuously regenerated, and electrical energy is produced between the anode and cathode.

Other objects and features of this invention will become apparent from time to time throughout the specification and claims as hereinafter related.

This invention is based upon my discovery that a platinum-group metal salt used as a catalyst in the oxidation of olefins to carbonyl compounds can be continuously regenerated by electrochemical oxidation. In the oxidation of olefins useing a platinum-group metal salt as catalyst, the rate-determining step in the process appears to be the regeneration of the catalyst. In the operation of a process of that type, the platinum-group metal salt tends to be reduced to a lower oxidation state and in some cases to the metal. When the salt is completely reduced to the metal, the regeneration of the catalyst salt is extremely difficult. I have found that if the process is carried out in an electrochemical cell consisting of separate anodic and cathodic reaction zones joined through a salt bridge or a semipermeable membrane, and having an anode and cathode connected to a source of electric current (e.g., battery or other D.C. source), and the oxidation of the olefin is carried out in the anodic zone, the catalyst is continually regenerated by electrochemical oxidation. In this process, carbonyl compounds, e.g., aldehydes or ketones, are withdrawn from the anodic reaction zone in which the catalyst is contained, and hydrogen is generated and withdrawn from the cathodic reaction zone. I have further found that if the process is carried out in an apparatus comprising separate anodic and cathodic reaction zones containing an anode and cathode connected through an external electric circuit, and said zones are connected by a salt-bridge or semi-permeable membrane, it is possible to oxidize an olefin to carbonyl compounds with a simultaneously generation of electrical energy. In this embodiment of the invention, the olefin feed is introduced into the anodic reaction zone and oxygen is introduced into the cathodic reaction zone, with the result that the olefin is oxidized to an aldehyde or ketone and electric current is generated. This embodiment of the invention therefore functions generally as a fuel cell.

In carrying out this process, the containers used as reactors can be made of any suitable material which is not attacked chemically by the reactants or reaction products. The anodic reaction zone contains a solution of a platinum-group metal salt, preferably a halide such as palladium chloride, platinum chloride, palladium bromide, platinum bromide, etc., in solution in aqueous acid, e.g., hydrochloric acid, acetic acid, sulfuric acid, phosphoric acid, etc., in a concentration sufficient to maintain a strongly acid solution, preferably having a pH of 0–2. The anodic reaction zone also contains an aqueous solution of any water-soluble salt or acid to provide an electrolyte for electrical conduction. The anode and cathode used in the reaction zones are of an oxidation-resistant, highly porous, high-surface-area material. The anode and cathode are preferably very porous, high-surface-area metals of the Raney type. Electrodes formed of Raney copper, Raney nickel, Raney silver, Raney platinum, etc., can be used in this process inasmuch as these metals provide intimate contact for carrying out the electrochemical reactions involved in the process.

Because of the heterogeneous nature of the reaction, it is necessary to provide for intensive intimate contact of the phases promoting the reaction. Intimate contact between the gaseous olefins and the aqueous solution and electrode, and porous metal electrode, can be attained by mechanical agitation or by introducing the gaseous reactant through a porous electrode to provide for a high surface area of contact. In order to increase the miscibility of the reacting phases, it is possible to use other solvents or blending agents such as acetic acid, dioxane, and the like. Also, the solubility of gaseous reactants can be increased by using high pressures of the order of 1 to 50 atmospheres. The time of reaction may vary from a fraction of a second to many minutes or hours. The time of contact between reactants depends upon the reactivity of the olefin hydrocarbon as well as the composition of the catalyst solution and the temperature and pressure of the reaction. It has been found that lower olefins react relatively rapidly while longer reaction times are required for higher olefins. While the compounds of the platinum-group metals which are soluble in water are all operative in this process, the palladium compounds are preferred because of their higher catalytic activity. The reaction temperature can vary from 0° to 200° C., although temperatures of 50° to 150° C. are preferred. High temperatures should be avoided unless means are provided for rapid withdrawal of reaction products to prevent further oxidation of the carbonyl compounds produced in the reaction. Olefine hydrocarbons are generally useful in this process and may be used either alone or in admixture with other hydrocarbons or with inert diluents. Olefins which can be used in this process include ethylene, propylene, butene, pentene, hexene, octene, decene, octadecene, cyclohexene, styrene, etc. The normally gaseous olefins, ethylene, propylene and butene, are more reactive and are preferred materials in this process although other olefins are generally useful. The carbonyl compounds produced in this process can be recovered from the non-converted gas stream by fractional condensation, scrubbing, solvent extraction, etc. Difficultly volatile materials produced in the process can be recovered by liquid extraction, separation, or filtration.

The following non-limiting examples are illustrative of several embodiments of the process of this invention.

*Example 1*

In FIGURE 1 of the drawing there is shown a diagrammatic view of the apparatus and flow diagram for the process of oxidizing an olefin with simultaneous electrochemical regeneration of the oxidation catalyst. Reaction vessel 10 is connected through a salt bridge 12 to reaction vessel 14. Reaction vessels 10 and 14 are provided with platinum anode 16 and platinum cathode 18, respectively, connected to a variable-voltage D.C. power source 22. Reaction vessel 10 contains an aqueous solution of hydrochloric acid (1.3 N) and palladium dichloride (50 g./liter), and reaction vessel 14 contains an aqueous solution of 1.3 N hydrochloric acid. Olefin feed is introduced to reaction vessel 10 through line 20, and reaction products are withdrawn through line 24. In reaction vessel 14, make-up water is introduced through line 26 and hydrogen is withdrawn through line 28. In this process, the acid in reaction vessel 14 functions merely as a supporting electrolyte for conducting electric current, and any other acid or water-soluble salt could be used to render the solution electrically conducting. In reaction vessel 10, palladium chloride is used as the preferred oxidation catalyst although other palladium salts, and other water-soluble salts of platinum-group metals (e.g., water-soluble salts of platinum, iridium, osmium, ruthenium, and rhodium), are used in an acidic solution sufficiently acid (preferably having a pH of 0–2) to maintain the salt in solution.

In one experiment using an apparatus as described, but without the power source connected to the anode and cathode, ethylene was bubbled through the hydrochloric solution of palladium chloride for 1 hour at room temperature. Acetaldehyde was present in the gaseous effluent from the reactor in substantially quantitative yields based on the ethylene consumed in the reaction. In the course of the oxidation, the palladium chloride was reduced to metallic palladium, and at the end of about 2 hours all of the palladium had precipitated as metal and the oxidation of ethylene ceased. At this point, an electric potential was applied from a D.C. power source to anode 16 and cathode 18. The palladium which had precipitated was re-oxidized to palladium dichloride, and at the same time hydrogen was evolved at the cathode. When ethylene was again bubbled through the anodic reaction zone, acetaldehyde was formed as the product.

In another experiment, an electric potential of 1.7 v. was applied to anode 16 and cathode 18 from D.C. power source 22 and ethylene was bubbled through the anodic reaction zone as previously described. Acetaldehyde was continuously formed and was present in the effluent gases in substantially quantitative yields based on the ethylene consumed in the reaction. This reaction was carried out over an extended period of time with continuous formation of acetaldehyde and no precipitation of metallic palladium occurred (due to the continuous electrochemical oxidation of the palladium), while hydrogen was continuously evolved in the cathodic reaction zone. When this process is operated over an extended period of time, it is necessary to supply make-up water, as through line 26, to replace the water used in oxidation of the olefin and generation of hydrogen.

When other olefins (or mixtures of olefins) are substituted in this process for ethylene, analogous carbonyl compounds (aldehydes and ketones) are obtained. When propylene is oxidized in reaction vessel 10, acetone is recovered as the reaction product. Similarly, when butene-1 is introduced into reaction vessel 10, it is oxidized to methyl ethyl ketone. When higher olefins, such as pentene, hexene, octene, decene, octadecene, cyclohexene, etc., are introduced as reactants into reaction vessel 10, they are oxidized to ketones or aldehydes. However, since the ketones or aldehydes which are formed from these higher olefins are normally liquid, it is necessary to remove them by conventional separatory techniques, such as distillation, extraction, etc. In some cases it is desirable to carry the process out at higher temperatures and pressures, and in such cases, temperatures in the range from 0° to 200° C. can be employed, and pressures in the range from 1 to 50 atmospheres can be used, to insure more intimate contact between the reactants and to produce a more rapid reaction.

*Example II*

Figure 2:
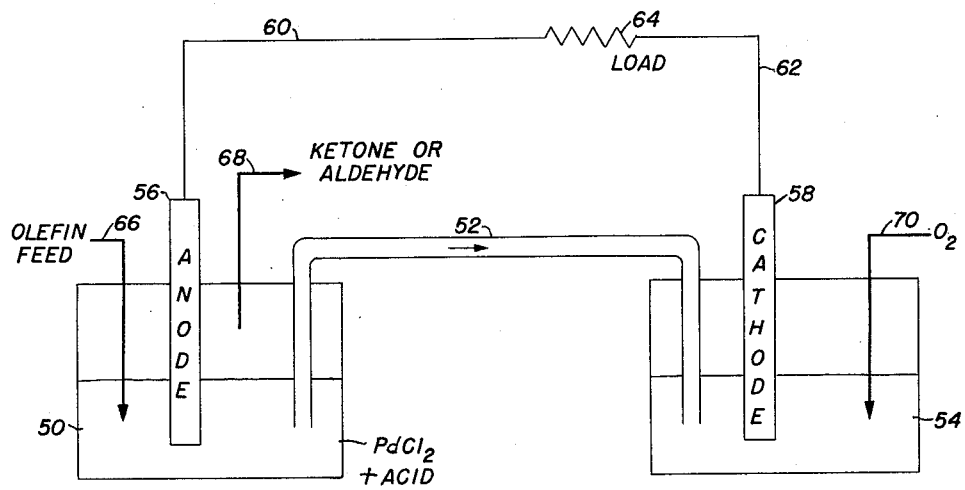

In FIGURE 2 of the drawing there is shown a diagrammatic view of the apparatus and a flow diagram for the process for an alternate embodiment of the invention. Reactor 50 is connected through salt bridge 52 to reactor 54. Reactors 50 and 54 are provided with an anode 56 and cathode 58, respectively, which are formed of a porous, high-surface-area metal. Anode 56 and cathode 58 are preferably formed of Raney platinum in a carbon matrix, but can be formed of other porous, high-surface-area metals such as Raney copper, Raney nickel, Raney silver, or platinum sponge. Anode 56 and cathode 58 are connected through wires 60 and 62 to load 64 which can be any electrically operated or electrically energized device. In this apparatus, reaction vessel 50 contains a solution of palladium dichloride (50 g./liter) and 3.0 N hydrochloric acid. Reaction vessel 54 contains a 3.0 N solution of hydrochloric acid. Olefin feed is introduced through line 66 into reaction vessel 50 and reaction products are withdrawn through line 68. Oxygen (or other oxidizer such as oxygen-containing gas, air, nitrogen dioxide, hydrogen peroxide, etc.) is introduced into reaction vessel 54 through line 70. This embodiment of the invention functions as a fuel cell and is operable to convert olefins into carbonyl compounds (e.g. aldehydes and ketones) with simultaneous generation of electrical energy.

Using air as the oxidant in the cathodic reaction zone, and ethylene in the anodic reaction zone, the process functions in the following manner. Ethylene is bubbled through the hydrochloric acid solution of palladium dichloride in contact with the Raney platinum anode. In the cathodic reaction zone, air is bubbled through the hydrochloric acid solution in contact with the Raney platinum cathode. In the anodic reaction zone, palladium dichloride catalyzes the oxidation of ethylene to acetaldehyde with simultaneous reduction of the palladium chloride toward the lowest oxidation state. The anodic reactions are as follows:

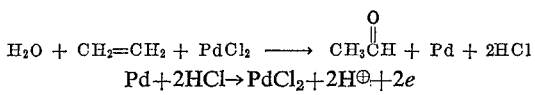

$Pd + 2HCl \rightarrow PdCl_2 + 2H^{\oplus} + 2e$

In the cathodic reaction zone, oxygen reacts with hydrogen ion to yield water and electrical energy. The cathodic reaction is as follows:

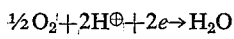

The net effect of the reactions in the cathodic and anodic reaction zones is that ethylene is oxidized to acetaldehyde and palladium metal is alternately reduced and oxidized with simultaneous generation of electrical energy. The maximum potential generated by a cell of this type is the sum of the anode potential obtained as a result of palladium metal being transformed to a +2 oxidation state (−.83 volt) added to the cathode potential of oxygen being reduced to water (+1.23 volts). The maximum reversible potential of this cell is thus approximately 0.4. This value will vary depending on the concentrations of compounds in the electrolyte. When other platinum-group metal salts are used as the oxidation catalysts, the reversible electrical potential is slightly different.

In this embodiment of my invention any water-soluble, platinum-group metal salt dissolved in aqueous acid can be used in the anodic reaction zone, and any acid or salt solution can be used in the cathodic reaction zone to provide for conduction of electric current. The anode and cathode can be of any suitable design, but a porous high-surface-area metal, such as Raney silver, Raney copper, Raney nickel, Raney platinum, etc., is preferred. If desired, the process can be carried out at elevated temperatures up to about 200° C. and elevated pressures up to about 50 atmospheres to effect higher reaction rates and simultaneous generation of larger amounts of electrical energy. Other co-oxidants can also be used in the anode chamber, such as cupric halide salts. In this case, the copper salt will maintain the Group VIII salt in the oxidized state after the Group VIII salt has oxidized the olefin feed, and the reduced copper salt will in turn be re-oxidized by the external power source, or by the oxidizer passed into the cathode. As mentioned in connection with the first embodiment of the invention, other olefins can be substituted in this process. When propylene is used as a reactant in the anodic reaction zone, the product recovered is acetone. Similarly, the substitution of butene-1 as a reactant produces methyl ethyl ketone. Other olefins which can be used include pentene, hexene, decene, octadecene, cyclohexene and other straight-and branched-chain mono-olefins as well as cyclic mono-olefins. The rate of reaction and yield of desired carbonyl compounds (e.g., aldehydes and ketones) can be controlled somewhat by control of the temperature and pressure of the reaction, and by control of the rate of introduction of oxidizer into the cathodic reaction zone. While this process is primarily concerned with the use of oxygen or air, or oxygen-enriched air, as an oxidizer, the use of other oxygen-containing oxidizers is contemplated.

While I have described my invention fully and completely with special emphasis upon several preferred embodiments, I wish it to be understood that within the scope of the appended claims this invention may be practiced otherwise than as specifically described therein.

The embodiments of the invention in which an exclusive property or privilege is claimed are defined as follows:

1. In a process for production of carbonyl compounds by oxidation of at least one olefin hydrocarbon in the presence of an aqueous catalytic solution of a halide of a platinum-group metal at a temperature of 0°–200° C., in which the catalyst is reduced toward a lower oxidation state, the improvement which comprises oxidizing at least one olefin hydrocarbon by contacting the same with said aqueous catalytic solution in an anodic reaction zone maintained in electrolytic communication with an aqueous solution in a cathodic reaction zone, said anodic zone containing an oxidation resistant anode and said cathodic zone containing a cathode, and simultaneously with the oxidation of said olefin hydrocarbon electrochemically oxidizing said catalyst to regenerate the same in the anodic zone, hydrogen being evolved at the cathode, by connecting a direct-current source between said anode and cathode.

2. A process in accordance with claim 1 in which water is the source of oxygen for oxidation of the olefin, and water is fed to the cathodic reaction zone at a rate sufficient to maintain a substantially constant water level.

3. A process in accordance with claim 1 in which the solution in the anodic reaction zone comprises an aqueous solution of a palladium halide in hydrochloric acid.

4. A process in accordance with claim 1 in which the solution in the anodic reaction zone comprises an aqueous solution of a platinum halide in hydrochloric acid.

5. A process in accordance with claim 1 in which the olefin is ethylene and acetaldehyde is withdrawn as a product from the anodic reaction zone.

6. A process in accordance with claim 1 in which the olefin is butene and methyl ethyl ketone is withdrawn as a product from the anodic reaction zone.

7. A process in accordance with claim 1 in which the anode and cathode are formed of an oxidation-resistant metal in a highly porous, high-surface-area form.

8. A process in accordance with claim 1 in which the anodic reaction zone contains a solution of palladium chloride in hydrochloric acid, ethylene is introduced adjacent to the anode, and acetaldehyde is withdrawn as a product.

References Cited in the file of this patent

UNITED STATES PATENTS

| 1,431,301 | Grunstein et al. | Oct. 10, 1922 |
| 1,477,951 | Grunstein | Dec. 18, 1923 |
| 1,992,309 | Hultman | Feb. 26, 1935 |

OTHER REFERENCES

Smidt: Angew. Chem., 71, No. 5, 176–182, Mar. 7, 1959.